US006996817B2

(12) United States Patent  (10) Patent No.: US 6,996,817 B2
Birum et al.  (45) Date of Patent: Feb. 7, 2006

(54) METHOD AND SYSTEM FOR UPGRADING AND ROLLING BACK VERSIONS

(75) Inventors: Derrick Jason Birum, Duvall, WA (US); Christopher Richard Newcombe, Kirkland, WA (US); Paul David Jones, Renton, WA (US); Richard Donald Ellis, Carnation, WA (US); Mikel Howard Thompson, Shoreline, WA (US)

(73) Assignee: Valve Corporation, Bellevue, WA (US)

( * ) Notice: Subject to any disclaimer, the term of this patent is extended or adjusted under 35 U.S.C. 154(b) by 484 days.

(21) Appl. No.: 10/317,852

(22) Filed: Dec. 11, 2002

(65) Prior Publication Data

US 2003/0221189 A1   Nov. 27, 2003

Related U.S. Application Data

(60) Provisional application No. 60/341,079, filed on Dec. 12, 2001.

(51) Int. Cl.
*G06F 9/44* (2006.01)
(52) U.S. Cl. ............... 717/170; 717/169; 717/171; 717/172; 707/203
(58) Field of Classification Search ........ 717/168–173, 717/175–178; 709/220, 226, 229, 203; 707/202–204, 1; 703/2
See application file for complete search history.

(56) References Cited

U.S. PATENT DOCUMENTS

| 5,619,716 | A | | 4/1997 | Nonaka et al. ............. 395/800 |
| 5,732,275 | A | | 3/1998 | Kullick et al. ............. 395/712 |
| 5,742,829 | A | | 4/1998 | Davis et al. ............. 395/712 |
| 5,764,992 | A | | 6/1998 | Kullick et al. ............. 395/712 |
| 5,835,601 | A | | 11/1998 | Shimbo et al. ............. 380/49 |
| 5,850,535 | A | * | 12/1998 | Maystrovsky et al. ......... 703/2 |
| 5,915,112 | A | | 6/1999 | Boutcher ............. 395/684 |
| 5,960,189 | A | * | 9/1999 | Stupek et al. ............. 717/169 |
| 6,029,175 | A | | 2/2000 | Chow et al. ............. 707/104 |
| 6,256,773 | B1 | * | 7/2001 | Bowman-Amuah ......... 717/121 |
| 6,292,889 | B1 | * | 9/2001 | Fitzgerald et al. ............. 713/1 |
| 6,332,198 | B1 | * | 12/2001 | Simons et al. ............. 714/6 |
| 6,453,353 | B1 | * | 9/2002 | Win et al. ............. 709/229 |
| 6,578,054 | B1 | * | 6/2003 | Hopmann et al. ......... 707/201 |
| 6,678,700 | B1 | * | 1/2004 | Moore et al. ............. 707/200 |
| 6,684,396 | B1 | * | 1/2004 | Brittain et al. ............. 717/168 |

(Continued)

OTHER PUBLICATIONS

TITLE: Modular Synchronization in Distributed, Multiversion Database: Version control and concurrency control, author: Agarwal et al, IEEE, 1993.*

(Continued)

*Primary Examiner*—Chameli C. Das
(74) *Attorney, Agent, or Firm*—Darby & Darby PC; Jamie L. Wiegand

(57) ABSTRACT

A method and system for versioning of applications is provided. A version of an application may be updated or rolled back transparently to the client. A list of resources in a current version of an application is created and compared to the list of resources in a new version. When a resource is not included in the current version but is included in the new version, a notation is made to include the resource in the new version. When an extra resource is in the current version but not in the new version, a notation is made to purge the resource so that it is not included in the new version. These notations may be created in a purge list used by the client to request the resources needed to change versions. No interaction is needed by the client to change versions.

21 Claims, 7 Drawing Sheets

U.S. PATENT DOCUMENTS

| | | |
|---|---|---|
| 6,694,450 B1 * | 2/2004 | Kidder et al. .................. 714/15 |
| 6,711,593 B1 * | 3/2004 | Gordon et al. ............... 707/204 |
| 6,718,549 B1 * | 4/2004 | Narin et al. ................. 717/178 |
| 6,748,470 B2 * | 6/2004 | Goldick ....................... 710/200 |
| 6,751,608 B1 * | 6/2004 | Cohen et al. ................... 707/3 |
| 6,766,428 B2 * | 7/2004 | Saulsbury et al. ........... 711/154 |
| 6,771,290 B1 * | 8/2004 | Hoyle ......................... 715/745 |
| 6,862,616 B1 * | 3/2005 | Tompkins ................... 709/223 |
| 6,871,345 B1 * | 3/2005 | Crow et al. ................. 717/175 |
| 6,880,086 B2 * | 4/2005 | Kidder et al. ............... 713/191 |
| 6,912,520 B2 * | 6/2005 | Hankin et al. ................. 707/1 |

OTHER PUBLICATIONS

TITLE: Requirements for Distributed Authoring and Versioning on the World Wide Web, author: Slein et al, IEEE, 1997.*

TITLE: Modeling of correlated Failures and Community Error recovery in Multiversion software, author: Nicola, IEEE, 1990.*

* cited by examiner

METHOD AND SYSTEM FOR UPGRADING AND ROLLING BACK VERSIONS

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. § 119(e).

BACKGROUND

In the past, when a user desired to change versions of software, the user was required to go to a store, purchase the new software, and install the new version on the user's computer.

Today, some software, including some upgrades, is distributed over the Internet. If the software can be packaged in a small executable, a software vendor may choose to distribute the software over the Internet. Using this model, a user can browse to a vendor's Website, pay for software, and then download the software.

This model has problems when the software requires a lot of disk space or when the user has an Internet connection with relatively low bandwidth. For example, to download a CD's worth of software (650 Megabytes) using a computer having a 28.8 kilobits per second (Kbs) connection to the Internet would take over 50 hours to download. Even with a 512 Kbs connection, downloading 650 Megabytes of software would take almost three hours—assuming that the connection remained up and delivered its full bandwidth. Another problem is that it is very hard to roll back to a previous version of the software.

What is needed is an efficient way to upgrade and roll back versions of applications.

SUMMARY

A method and system is directed at transparently changing versions of an application on a client. Generally, the version of an application may be updated or rolled back to the client. A list of resources in a current version of an application is created and compared to the list of resources in a new version. When a resource is not included in the current version but is included in the new version, a notation is made to include the resource in the new version. When an extra resource is in the current version but not in the new version, a notation is made to purge the resource so that it is not included in the new version. These notations may be created in a purge list used by the client to request the resources needed to change versions. No interaction is needed by the client to change versions.

According to one aspect of the invention, a determination is made as to when to being changing a current version to a new version on a client. When the determination is made, resources are identified that belong to the current version and the new version. Based on the resources, a determination is made as to the resources that are needed on the client for the new version. The resources needed for the new version are then configured on the client.

According to another aspect of the invention, the resources for the new version may be supplied to the client in advance of switching over to the new version. For example, the resources may be provided over many sessions to the client, rather than requiring the client to obtain all of the resources during one session.

According to another aspect of the invention, the client is supplied with the needed resources. When the resources are located on a server then the client downloads the resources from the server, stores the resource locally, modifies a data structure to indicate that the resource is stored locally, and the resources are provided to the client.

According to yet another aspect of the invention, the client may execute the new version with a subset of the resources needed for the new version stored locally on the client.

According to another aspect of the invention, a purge list is created that identifies the resources needed for the new version that are not in the current version. A list of resources to be added and deleted from the current version may be included in the purge list.

According to yet a further aspect of the invention, the purge list may be supplied to the client. The client may then use the list to request resources.

According to yet another aspect of the invention, the version may be changed in background of the client.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. The term "resource" is any data an application uses for execution. For example, a resource may be a particular portion of a file. The file may be a data file, a dynamic link library, an executable program, a component, and the like.

These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

FIGS. 4–7 illustrate processes for versioning and rolling back, in accordance with aspects of the invention. Generally, the method and system for changing versions of an application may be performed seamlessly for a user. Resources used in a different version may be supplied to the client before the switch to the different version occurs. This provides many advantages, including the efficient use of resources available to the client. For example, large resources used in the different version may be downloaded during non-peak times, thereby not adversely affecting the performance of the client.

Figure 4:
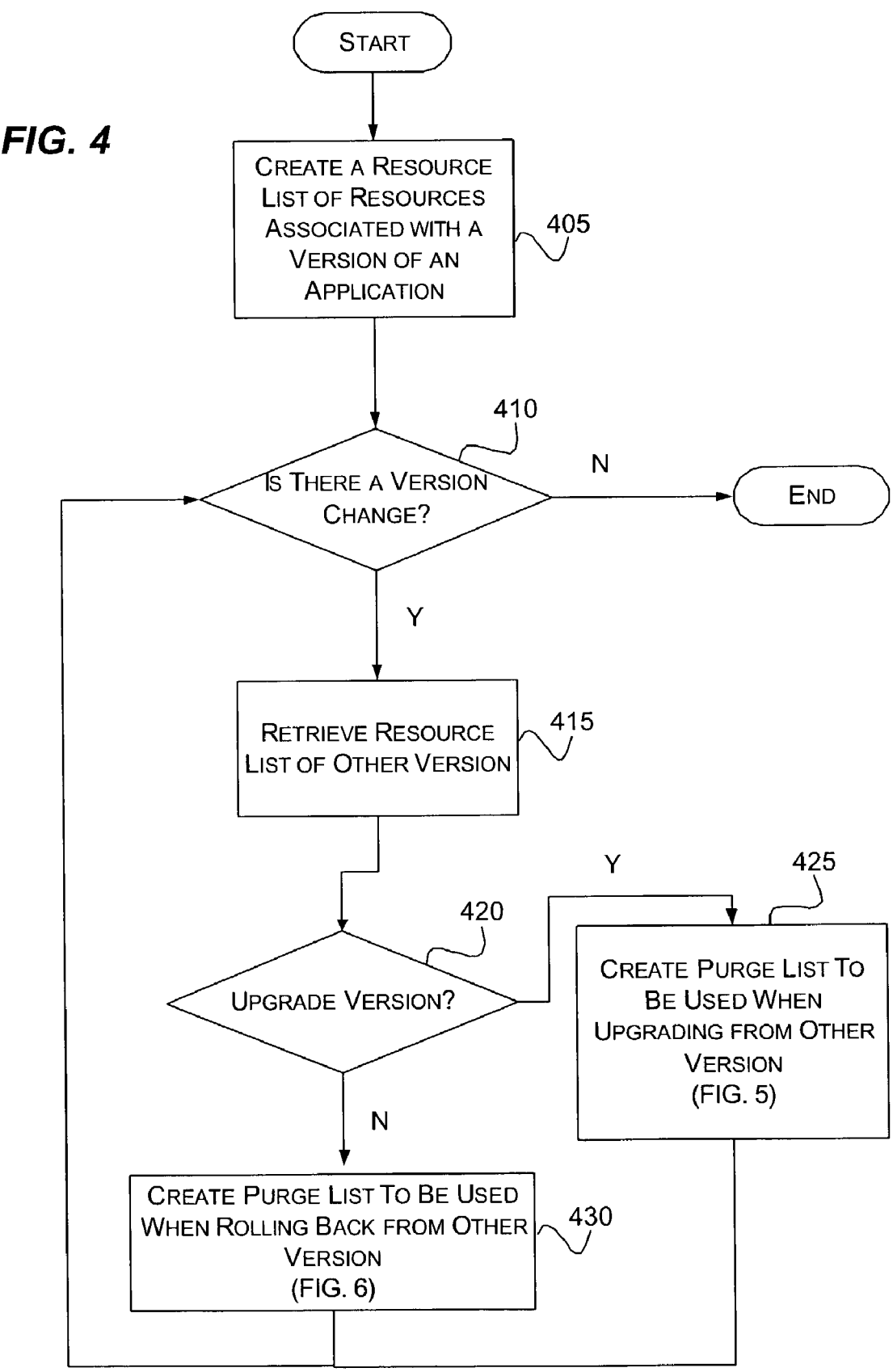
FIG. 4 shows a process for changing versions of an application.

Referring now to FIG. 4, after a start block, the process moves to block 405, where resources that belong to a particular version of an application are identified and placed in a list (hereinafter this version is called "V1").

Moving to decision block 410, a determination is made as to whether there is version change of the application. A version change may include minor changes to the current version, or substantial changes to the application. The version change may be an upgrade to a new version, or a roll back to a previous version of the application. When there is not another version, the process moves to an end block and returns to processing other actions.

When there is version change of an application, the process moves to block 415 where the resources in the new version are identified and put into a list (hereinafter this new version is called "V2").

The process transitions to block 420 where a determination is made as to whether the version change is an upgrade or a rollback. When the version change is an upgrade, the process moves to block 425 where an upgrade process steps through all of the resources in V1 to create a purge list used when upgrading versions (See FIG. 5 and related discussion).

Figure 6:
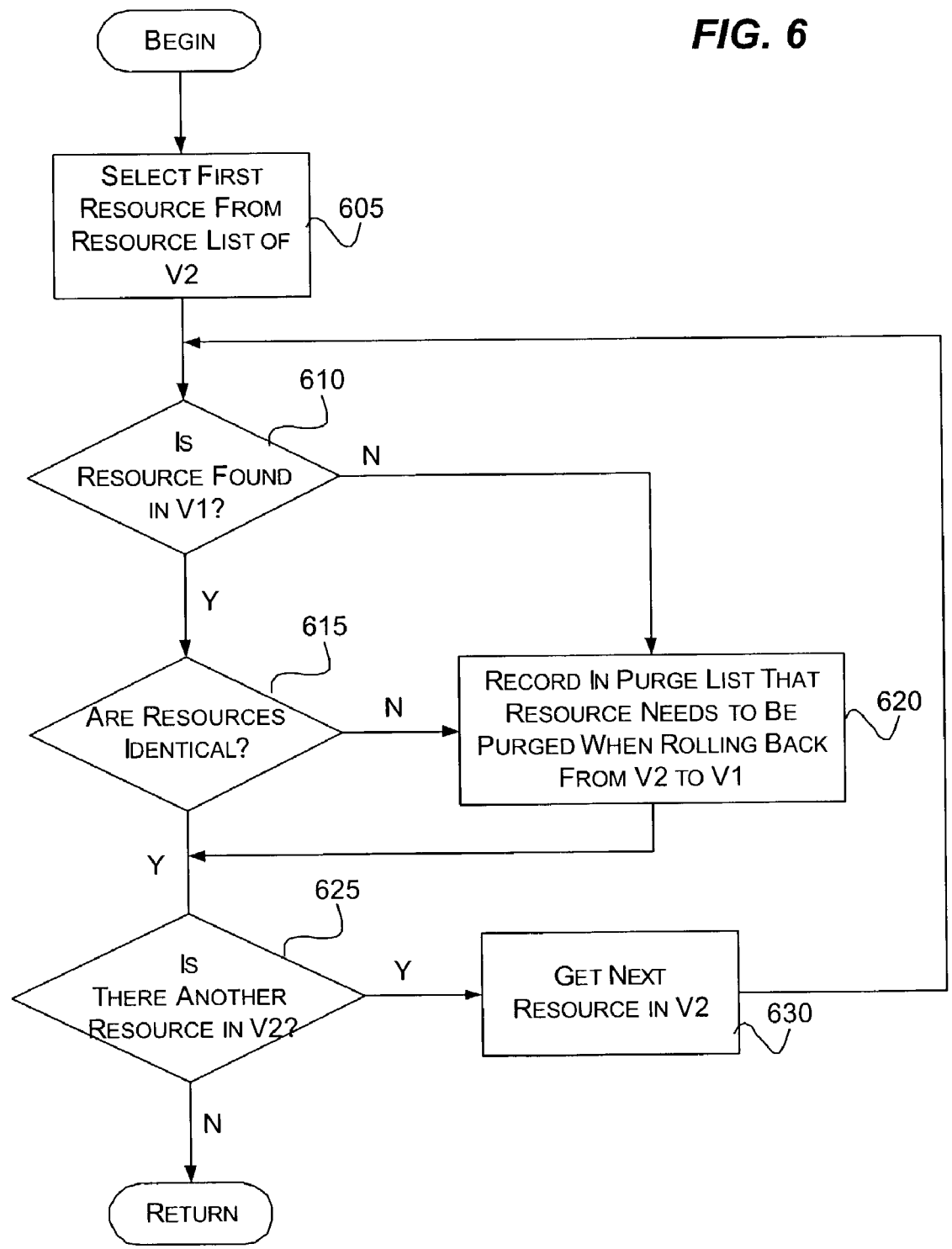
FIG. 6 shows a process for creating a purge list that is used when rolling back from a version.

When the version change is a roll back, the process flows to block 430, where a roll back process steps through the resources in V2 in order to create a purge list used when rolling back from other versions (See FIG. 6 and related discussion).

Figure 5:
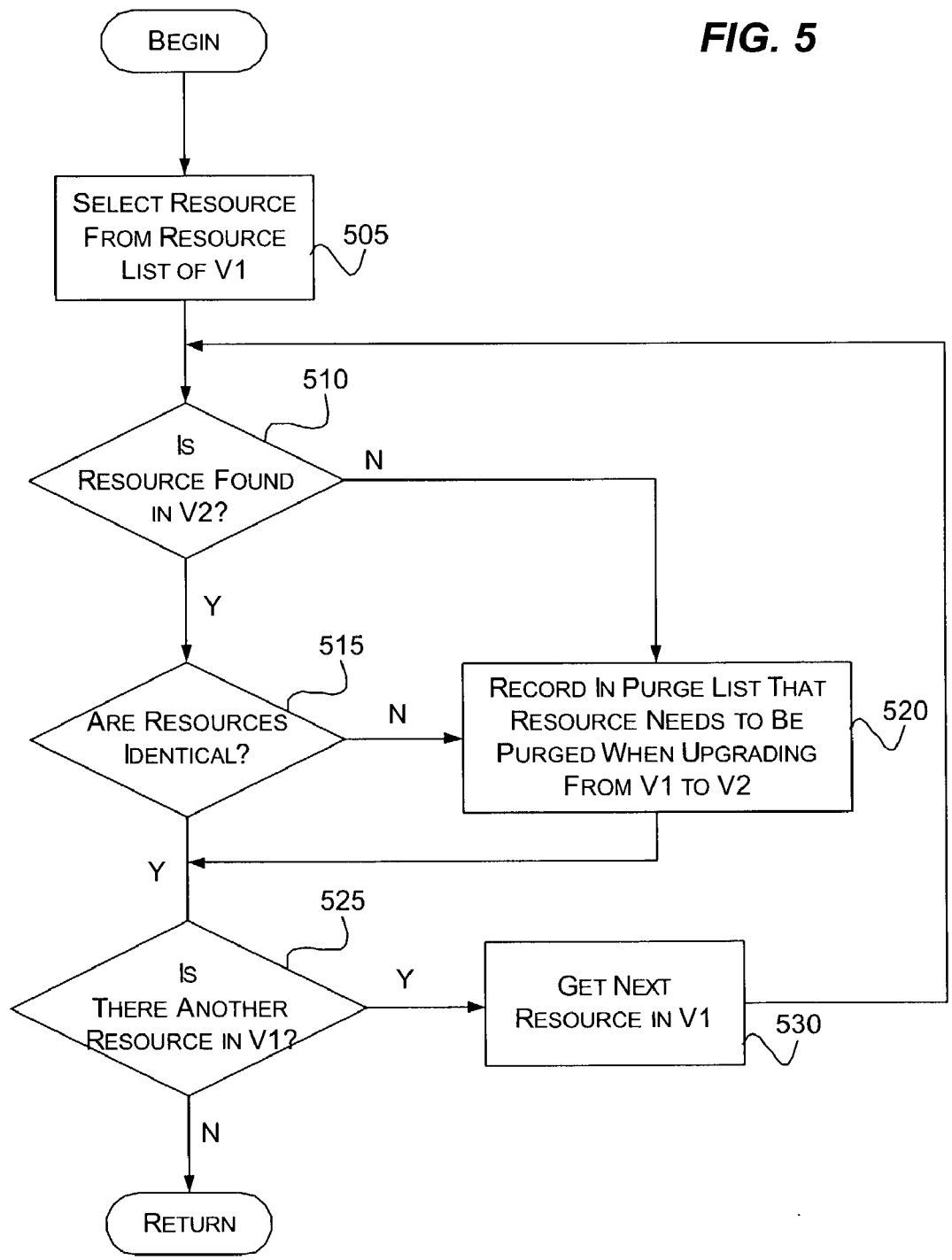
FIG. 5 illustrates a process for creating a purge list that is used when upgrading versions.

FIG. 5 illustrates a process for creating a purge list that is used when upgrading versions, in accordance with aspects of the invention. After a start block, the process moves to block 505, where a resource is selected from a file list relating to V1. According to one embodiment of the invention, the resources are selected in the order that they are recorded in the list. The resources, however, may be selected in any order.

Moving to decision block 510, a determination is made as to whether the resource is found in V2. If a resource exists in V1 but does not exist in V2, the process moves to block 520, where a notation in a purge list from V1 to V2 may be made indicating that the resource should be purged when upgrading to the new version.

If a resource exists both in V1 and in V2, the process moves to decision block 515, where the process compares the resource in V2 with the resource in V1. This comparison may be done through a byte-by-byte comparison, through a digital signature, or some other comparison.

If the resources are different, the process moves to block 520 where the process makes a notation in the purge list from V1 to V2 indicating that the resource should be purged when upgrading from V1 to V2. The process then flows to decision block 525.

At decision block 525, a determination is made as to whether there is another resource in V1. When there is another resource in V1, the process flows to block 530 where the next resource is selected. The process then flows to decision block 510 to repeat part of the process.

When there is not another resource in V1 the process moves to a return block, where the process returns to processing other actions.

The resources that are part of a version may be stored together or separately from the purge list. This process may be repeated for any number of versions. It may also be performed in a different order in order to roll back to a previous version.

FIG. 6 shows a process for creating a purge list that is used when rolling back from a version, in accordance with aspects of the invention. FIG. 6 is similar to FIG. 5 with the exception that this process moves from V2 to V1. Rolling back to a previous version refers to restoring the resources associated with a previous version of an application. If a new version introduces problems or is otherwise less desirable than an older version, a software developer may desire to cause a previous version of an application to be distributed to users. FIG. 6 illustrates this process for creating a roll back list, according to one embodiment of the invention.

A roll back process may create a rollback list between two versions in a similar manner in which an upgrade list may be created. For example, the process may step through each resource in V2. If the resource does not exist in V1, the process may mark in a rollback list that the resource should be purged when rolling back from V2 to V1. If the resource exists in both V1 and V2, the process may compare the resource in V1 with the resource in V2. If the resources are not identical, the process may mark in the rollback list that the resource should be purged when rolling back to V1. If a resource exists in V1 but not in V2, the process may not need to make any notation in the rollback list.

Whenever a new version is added, purge lists to be used for upgrading (and/or rolling back) may be created and stored for every version currently available or supported. These lists allow upgrading (or rolling back) from any version to any other version as described below.

When a client first requests content that is versioned, typically, the client does not already have a version of that content. One of the first things sent to the client when the client requests content is a list of resources associated with a version of that content. If the client does not have other versions of the content, a purge list may or may not be sent and is typically not needed.

Figure 7:
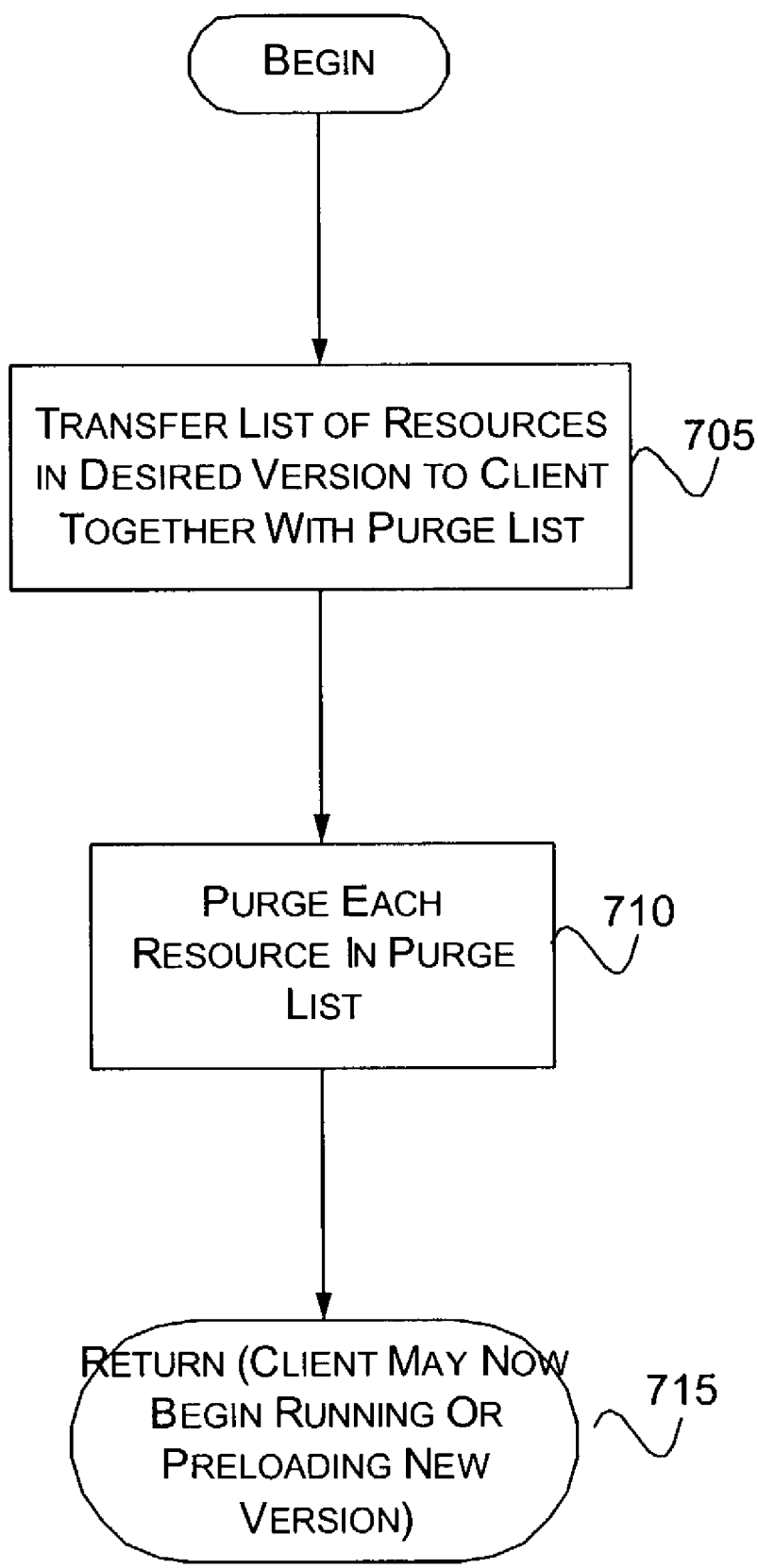
FIG. 7 illustrates a process for a mechanism for transparently accessing a file system that may be distributed locally and over a wide area network.

FIG. 7 illustrates a process used by a client to obtain an application version, in accordance with aspects of the invention. A client may check to see if it has the most current version of content by requesting the most recent version number from a content server. If the client has the most recent version, it may begin executing an application associated with the content. If the client does not have the most recent version, it may request a list of resources in the most recent version together with the purge list. The client may continue to execute its current version until a switch to the new version is made. This switch may occur before all of the resources associated with the new version are supplied to the client. A content server sends the list of resources in the most recent version together with a purge list (Block 705).

The process then moves to block 710, where the client may then purge each resource found in the upgrade list. When the client receives a request for a resource, it checks to see if the resource is contained in a cache or file that is locally accessible by the client computer. If the resource is not found locally, the client may request the resource from a content server using the list of resources in the most recent version. Thus, when upgrading from V1 to V2, when a resource exists in V2 that does not exist in V1, the resource will be requested when or before the client receives a request to access the resource.

To rollback to a previous version, the client may follow steps similar to the ones outlined above. Specifically, the client may request the list of resources associated with a previous version desired together with a purge list. The client may then go through the purge list to purge any resources identified. When the client receives a request for a resource, it may first determine whether the resource was located locally on the client computer. If the resource is not located locally, the client may request the resource from a content server. In its request, the client may identify the version of the resource requested.

When purging a resource, the client may or may not actually delete the resource. For example, the client may store the resource in another location easily accessible so that if that version of the resource is requested again, the client may rapidly access the resource without having to access the resource from a content server.

The client may be configured with a selectable amount of storage that it may use to store or cache content locally on a storage device. For example, the storage may be a percentage of space available on a hard drive or may be a fixed number of bytes. When a request for content will cause the client to exceed the storage amount, that client may use a least recently used (LRU) algorithm or some other content replacement strategy to determine which content stored locally will be removed to make room for the requested content.

A client may change versions in the background. That is, it may download resources that are new or changed in a new version of an application when bandwidth is available to do so. When the client has downloaded all or a subset of the resources required to change a version, it may "switch" over to the new version. Such a "switch" may be initiated by a third party, such as a content provider. The cache on the client computer may be segmented so resources associated with the new version are placed in one segment of the cache. The segmentation may be logical or physical. That is, resources in one segment may physically be next to or interspersed with resources in another segment while logically they are in separate segments. In switching between versions, a client may simply update a field that indicates which version of an application the client will execute.

A software vendor may cause one or more clients to download a new version of an application in the background. At a selected time, the software vendor may cause a switch to occur between versions. This method of changing versions may allow a more optimal and/or cost-effective manner in scheduling bandwidth used by a server in updating the one or more clients.

Certain resources in a version may remain untouched by version control. For example, resources that contain configuration information, such as keyboard mappings for a game, typically should not be overwritten when a new version is released. Such resources may be designated in an upgrade list as configuration files. When so designated, if such resources do not exist on a client computer, they may be updated with a "default" configuration file that may be included in the version. When such a resource does exist on a client computer, however, the upgrade list may specify that it should not be replaced. Alternatively, the upgrade list may specify a special process that should run to upgrade a configuration file. For example, the process may maintain data contained in the old configuration file while modifying the configuration file to be compatible with the new version.

In one embodiment of the invention, a client can change a file, such as a configuration file, and cause that file to be sent back to a server. This may be done to save state information, such as position in a game or keyboard mappings, so that the user can use another computer that can access the server to retrieve his or her settings or place in a game without having to separately provide the state information from a computer-readable media, such as a floppy disk.

The purge lists, and data, associated with the versioning and roll backs may be encrypted to aid in preventing unauthorized access. Many encryption methods may be used. For more discussion on encryption please refer to the Encryption and Decryption section.

The process then moves to block 715 where the process returns to processing other actions.

Illustrative Operating Environment

Figure 1:
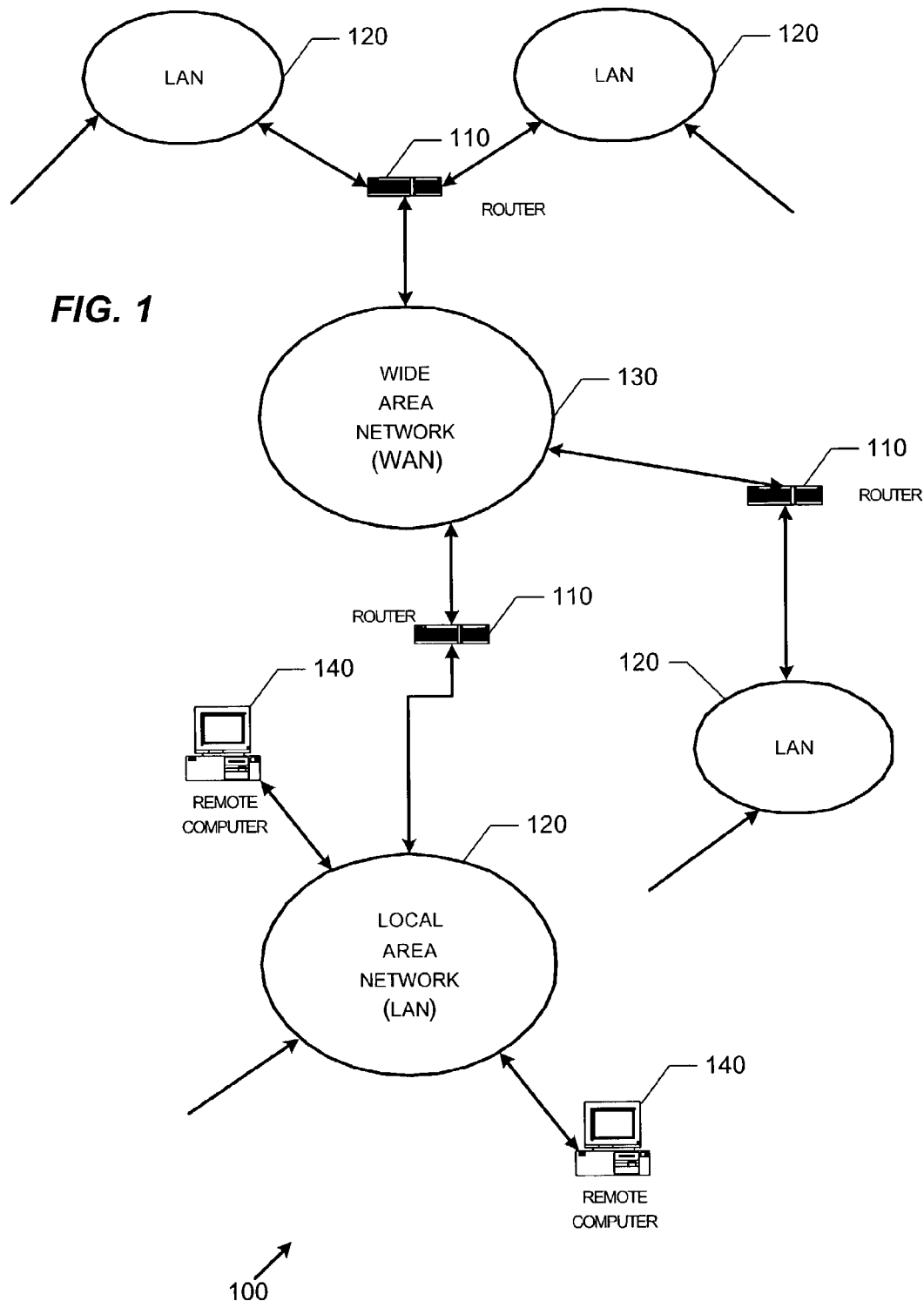
FIGS. 1–3 show components of an exemplary environment in which the invention may be practiced.
Figure 2:
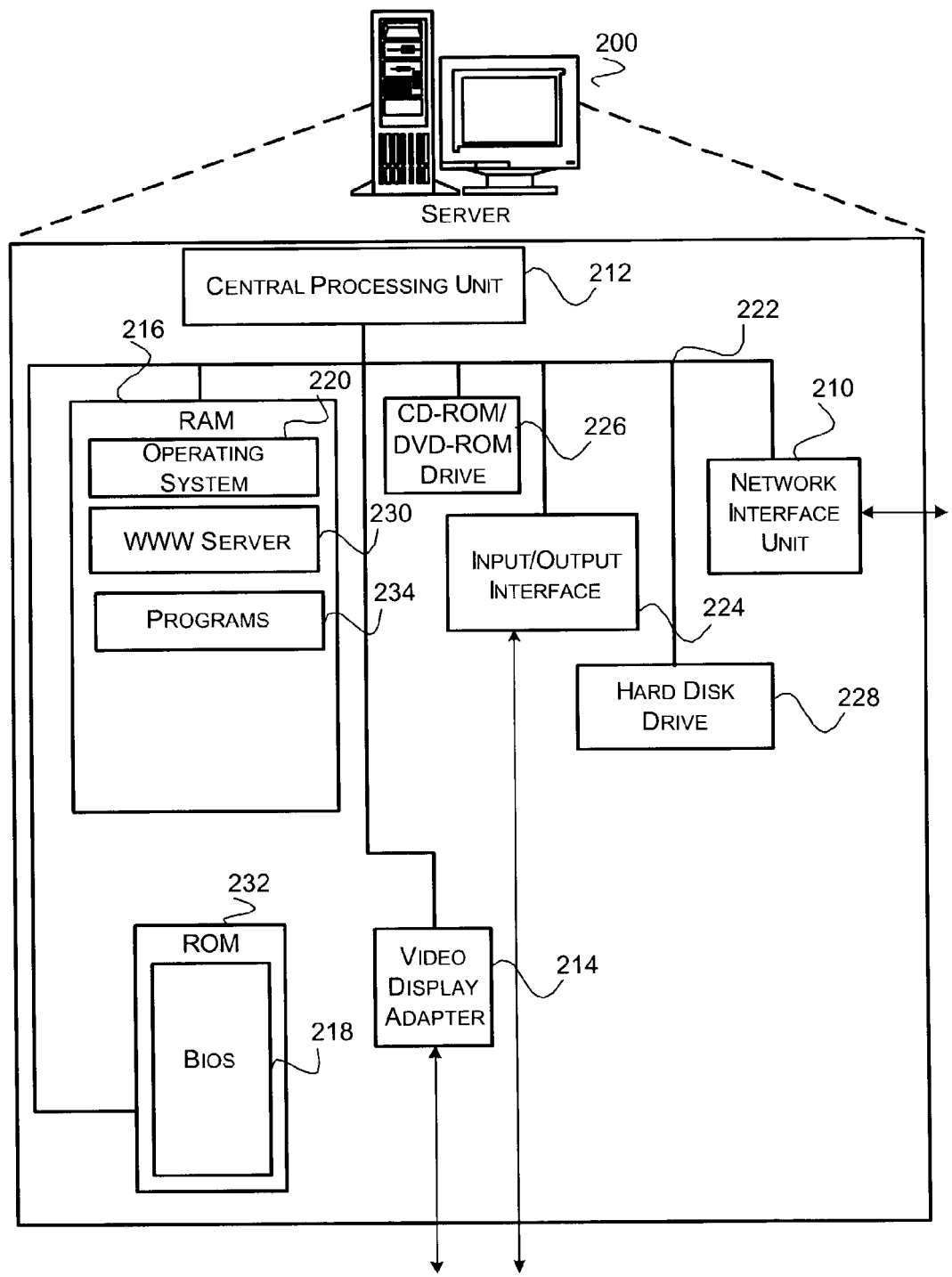
Figure 3:
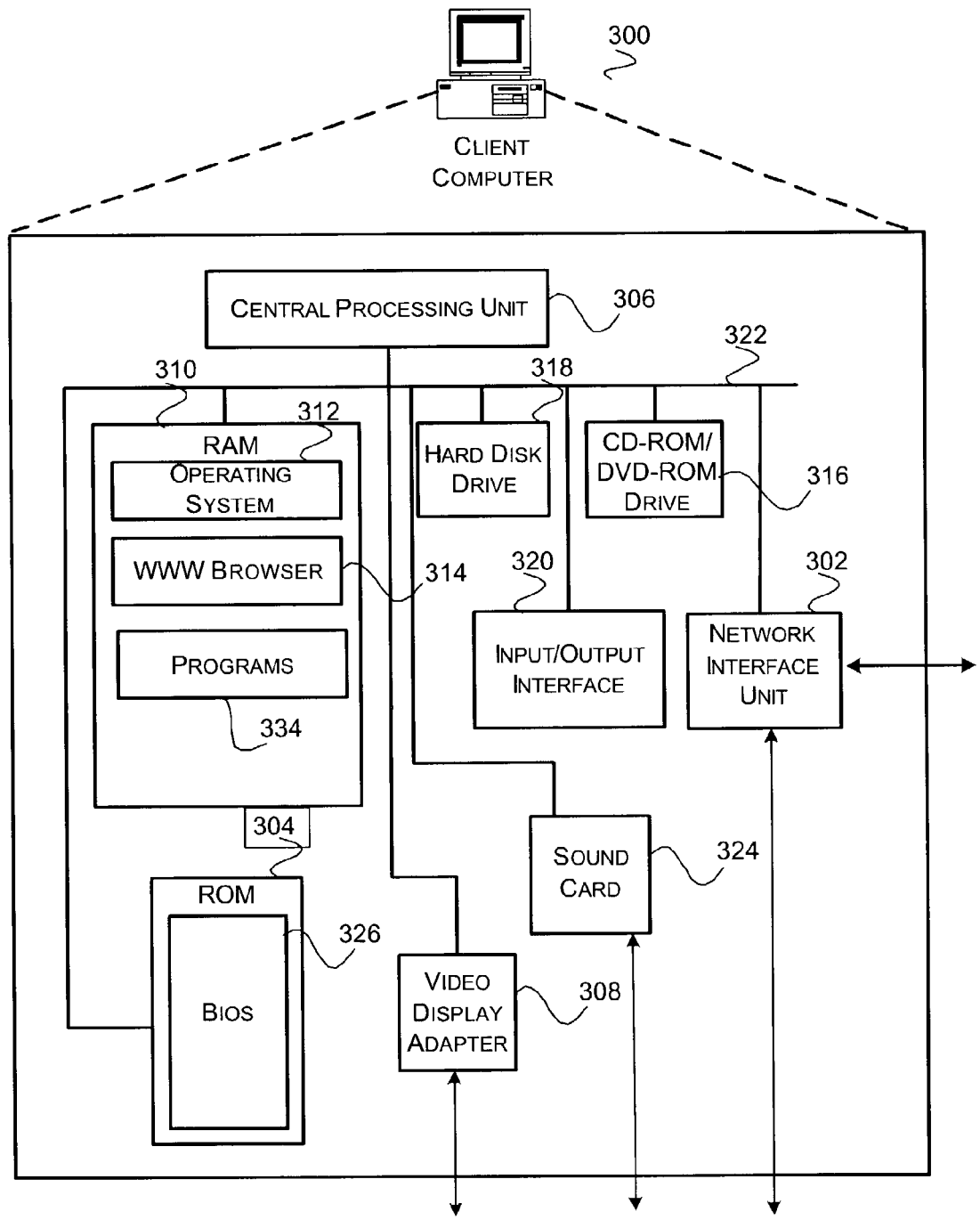

FIGS. 1–3 show components of an exemplary environment in which the invention may be practiced. Not all of the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world.

As the Internet has grown, so has the World Wide Web (WWW). Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server, such as the server shown in FIG. 2, may provide a WWW site, be a content server, a game server, an authentication server, etc. When providing Web pages, the server may have storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. A WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, other content, and/or services, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network.

Server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. The network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Client computer 300 may include many more components than those shown in FIG. 3. However, it is not necessary that those conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

In this disclosure, references will be made to client and server. Where appropriate, client should be construed to refer to a process or set of processes that execute on one or more electronic device, such as client computer 300 of FIG. 3. A client is not limited, however, to running on a client computer. It may also run on a server, such as WWW server 200 or be distributed among various electronic devices, wherein each device might contain one or more processes or routines that together constitute a client application. Where appropriate, client should be construed, in addition or in lieu of the discussion above, to be a device upon which one or more client processes execute, for example, client computer 300 or WWW server 200.

Similarly, server should be construed to refer to a process or set of processes that execute on one or more electronic devices, such as WWW server 200. Like a client, a server is not limited to running on a server computer. Rather, it may also execute on what would typically be considered a client computer, such as client computer 300 of FIG. 3, or be distributed among various electronic devices, wherein each device might contain one or more processes or routines that together constitute a server application. Where appropriate, server should be construed, in addition or in lieu of the discussion above, to be a device upon which one or more server processes execute, for example, server 200 or client computer 300.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++v4.x, an open-source class library of cryptographic techniques, the source code of which is hereby incorporated by reference, may be used in encrypting or decrypting applications and/or data. Other encryption and decryption libraries, both open source, commercial, and/or proprietary may be used without departing from the spirit or scope of the invention.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for secure hash algorithm 1. SHA1 is a cryptographic hash algorithm that produces a 160-bit hash value from an arbitrary length string. In other embodiments of the invention other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in the Bible. A RSA signature may be created and/or formatted as described in RSA's PKCS #1 v2.0, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is CryptoAPI, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for changing a version of an application transparently on a client, comprising:
   determining a list of resources to enable the client to change the version of the application, wherein the list of resources enables, at least in part, an upgrade to a new version and a rollback from a current version of the application;
   providing the client with at least a subset of the resources associated with the list of resources;
   changing at least a portion of the version of the application using, in part, a purge list and the list of resources; and
   executing at least a portion of the changed version of the application on the client before all of the resources associated with the changed version are available on the client.

2. The method of claim 1, wherein determining the list of resources, further comprises:
   determining the purge list that indicates at least one resource to purge from the current version, the at least one purged resource remaining accessible to the client independent of accessing a server.

3. The method of claim 2, wherein the purge list further comprises at least one resource to add to the current version to change to the new version of the application.

4. The method of claim 2, further comprising providing the purge list to the client.

5. The method of claim 1, wherein determining a list of resources further comprises identifying at least one resource associated with the current version of the application.

6. The method of claim 1, wherein the version may be changed on the client in a background.

7. The method of claim 1, wherein changing the version of the application further enables multiple versions of a shared resource to reside on the client.

8. The method of claim 7, wherein executing at least a portion of the changed version of the application further comprises:
   determining a minimum set of resources needed to execute the changed version.

9. The method of claim 1, wherein at least one of the list of resources, at least a subset of the resources, or a purge list is encrypted.

10. A server for changing a version of an application on a client, comprising:
    a network interface component for receiving and sending information;
    a processor, in communication with the network interface component, that includes machine instructions that cause the processor to perform operations, including:
      providing the client with a list of resources to enable the client to change the version of the application;
      providing the client with a purge list that enables an upgrade to a new version and a rollback from a current version of the application;
      enabling a modification of at least a portion of the version of the application on the client based on the purge list and the list of resources, wherein the client is enabled to execute at least a portion of the changed version of the application before all of the resources associated with the changed version are available on the client.

11. The system of claim 10, wherein the purge list further comprises at least one resource to purge from the current version, the at least one purged resource remaining accessible to the client independent of accessing a server.

12. The system of claim 10, wherein the purge list further comprises at least one resource to add to the current version when upgrading to the new version of the application.

13. The system of claim 10, wherein the purge list further comprises at least one resource to add or to remove when rolling back the current version of the application.

14. The system of claim 10, wherein providing a list of resources further comprises identifying at least one resource associated with the current version of the application.

15. The system of claim 10, wherein enabling a modification of at least a portion of the version further comprises changing at least the portion of the version of the application on the client in a background.

16. The system of claim 10, wherein enabling a modification of at least a portion of the version of the application further comprises determining a minimum set of resources needed to enable the client to execute at least a portion of the changed version of the application.

17. A client for changing a version of an application on a client, comprising:
   a network interface component for receiving and sending information;
   a processor, in communication with the network interface component, that includes machine instructions that cause the processor to perform operations, including:
      receiving a list of resources to enable the client to change the version of the application;
      receiving a purge list that enables an upgrade to a new version or a rollback from a current version of the application;
      modifying at least a portion of the version of the application on the client based on the purge list and the list of resources; and
      executing at least a portion of the changed version of the application before all of the resources associated with the changed version are available on the client.

18. The client of claim 17, wherein receiving a list of resources further comprises receiving a list of at least one resource associated with the current version of the application.

19. The client of claim 17, wherein modifying at least a portion of the version of the application further comprises modifying at least the portion on the client in a background.

20. The client of claim 17, wherein modifying at least a portion of the version of the application further comprises enabling multiple versions of a shared resource to reside on the client.

21. An apparatus for changing a version of an application on a client, comprising:
   means for determining a list of resources to enable a client to change the version of the application;
   means for determining a purge list that enables an upgrade to a new version or a rollback from a current version of the application on the client;
   means for providing the purge list and the list of resources to the client;
   means for providing the client with at least a subset of the resources associated with the list of resources;
   means for enabling a modification of at least a portion of the version of the application using purge list and the list of resources, wherein the client is enabled to execute at least a portion of the changed version of the application before all of the resources associated with the changed version are available on the client.

* * * * *

UNITED STATES PATENT AND TRADEMARK OFFICE
CERTIFICATE OF CORRECTION

PATENT NO. : 6,996,817 B2
APPLICATION NO. : 10/317852
DATED : February 7, 2006
INVENTOR(S) : Derrick Jason Birum et al.

It is certified that error appears in the above-identified patent and that said Letters Patent is hereby corrected as shown below:

Title page,
First Page Col. 2 (Other Publications), Line 2, Delete "et al," and insert -- et al.,--.
Col. 2 (Other Publications), Line 3, Delete "et al," and insert -- et al.,--.
Col. 2 (Attorney), Line 1, Delete "PC;" and insert --P.C.;--.

Column 6, Line 19, After "protocols___" delete ",".

Column 7, Line 47, delete "NAVIGATOR®" and insert -- NAVIGATOR® --.
Column 7, Line 47, delete "EXPLORER®" and insert -- EXPLORER® --.

Column 8, Line 28, delete "NT®." and insert -- NT® --.
Column 8, Line 36, delete "computer readable" and insert -- computer-readable --.

Column 10, Line 22 (Approx.) Delete "Rijndael," and insert Rjindael, --.

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,996,817 B2
APPLICATION NO. : 10/317852
DATED : February 7, 2006
INVENTOR(S) : Derrick Jason Birum et al.

It is certified that error appears in the above-identified patent and that said Letters Patent is hereby corrected as shown below:

In column 12, Claim 11, Line 64, delete "system" and insert --server--

In column 13, Claim 12, Line 1, delete "system" and insert --server--

In column 13, Claim 13, Line 4, delete "system" and insert --server--

In column 13, Claim 14, Line 7, delete "system" and insert --server--

In column 13, Claim 15, Line 10, delete "system" and insert --server--

In column 13, Claim 16, Line 14, delete "system" and insert --server--

Signed and Sealed this

Tenth Day of February, 2009

JOHN DOLL
*Acting Director of the United States Patent and Trademark Office*